United States Patent [19]

Scudder

[11] 4,179,873
[45] Dec. 25, 1979

[54] HARVESTERS FOR HARVESTING BERRIES

[75] Inventor: Roy Scudder, Marden, England

[73] Assignee: Edward Day, Marden, England

[21] Appl. No.: 797,387

[22] Filed: May 16, 1977

[30] Foreign Application Priority Data

May 17, 1976 [GB] United Kingdom ............... 20335/76

[51] Int. Cl.² ........................................... A01D 46/00
[52] U.S. Cl. ................................... 56/330; 56/328 R
[58] Field of Search ................ 56/330, 328 R, 328 TS

[56] References Cited

U.S. PATENT DOCUMENTS 4,063,406  12/1977  Burton ................................... 56/330

FOREIGN PATENT DOCUMENTS 1390495  4/1975  United Kingdom ................. 56/328 R Primary Examiner—Louis G. Mancene
Assistant Examiner—Paul J. Hirsch
Attorney, Agent, or Firm—Burmeister, York, Palmatier, Hamby & Jones

[57] ABSTRACT

The invention relates to a harvester for harvesting soft fruit such as grapes, blackcurrants, raspberries etc. from standing bushes and comprises shaker devices mounted on a subframe of the harvester for pivoting between two positions in one of which the harvester can harvest fruit from mature bushes and in the other of which the harvester can harvest fruit from young bushes.

5 Claims, 12 Drawing Figures

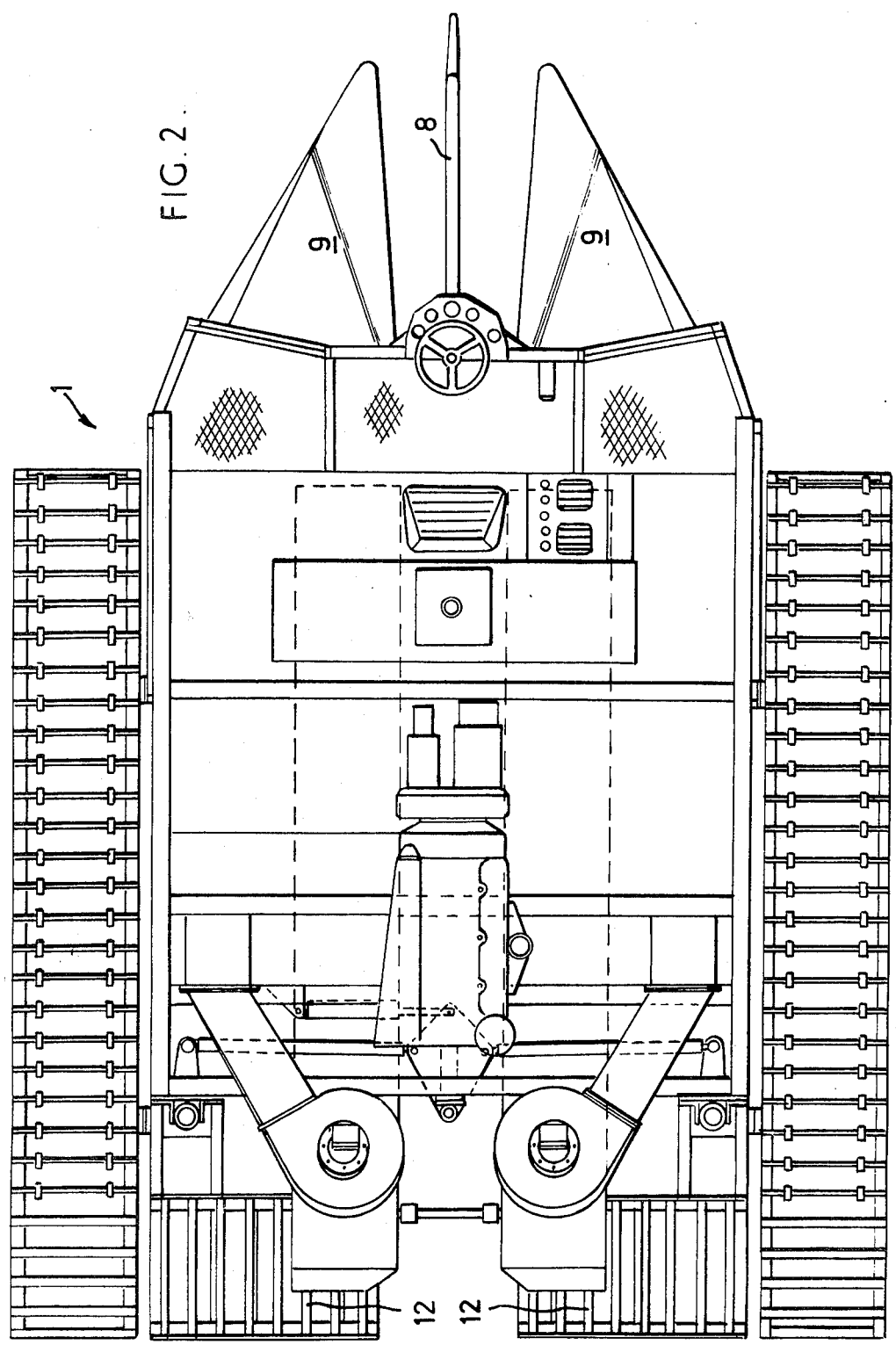

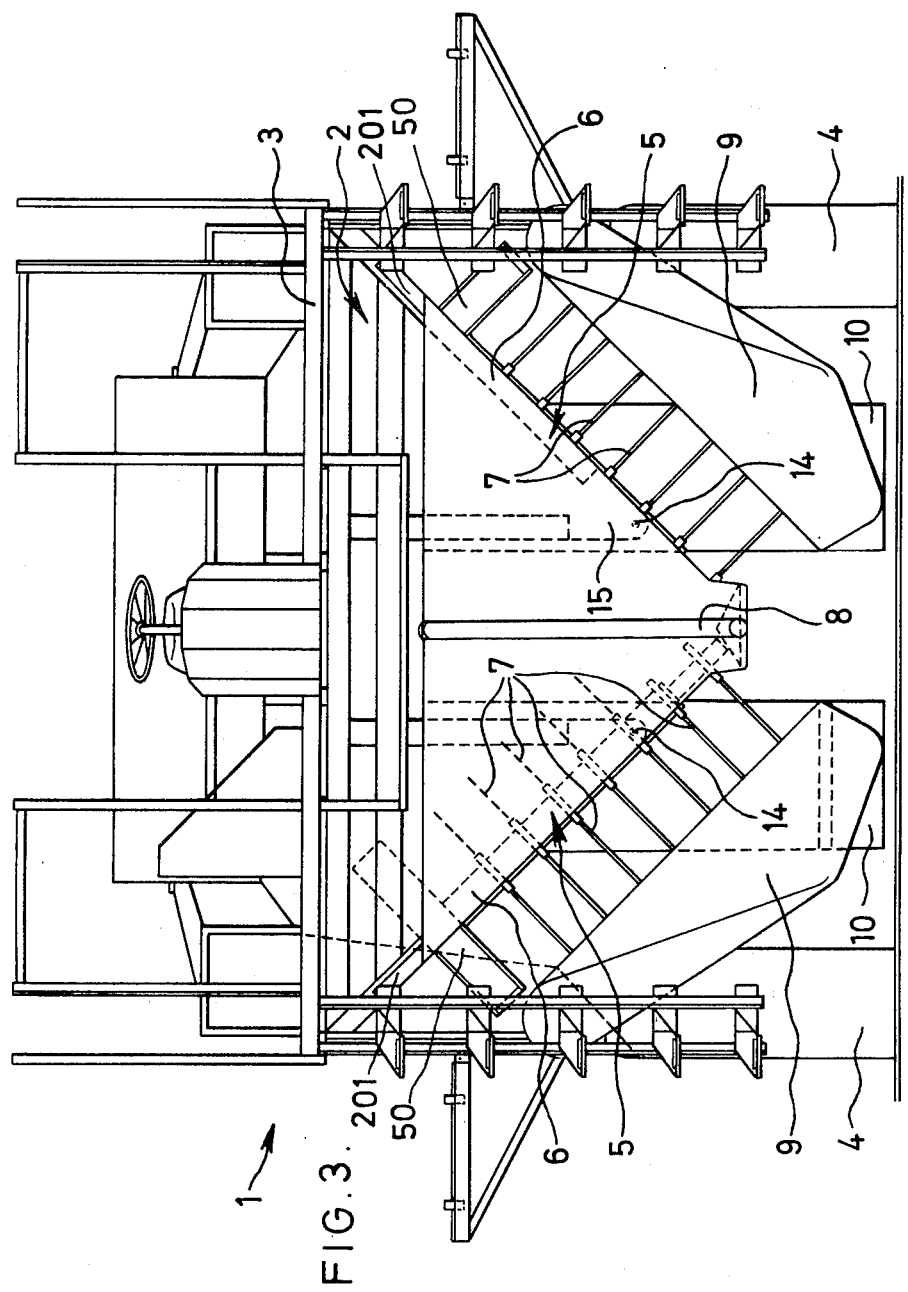

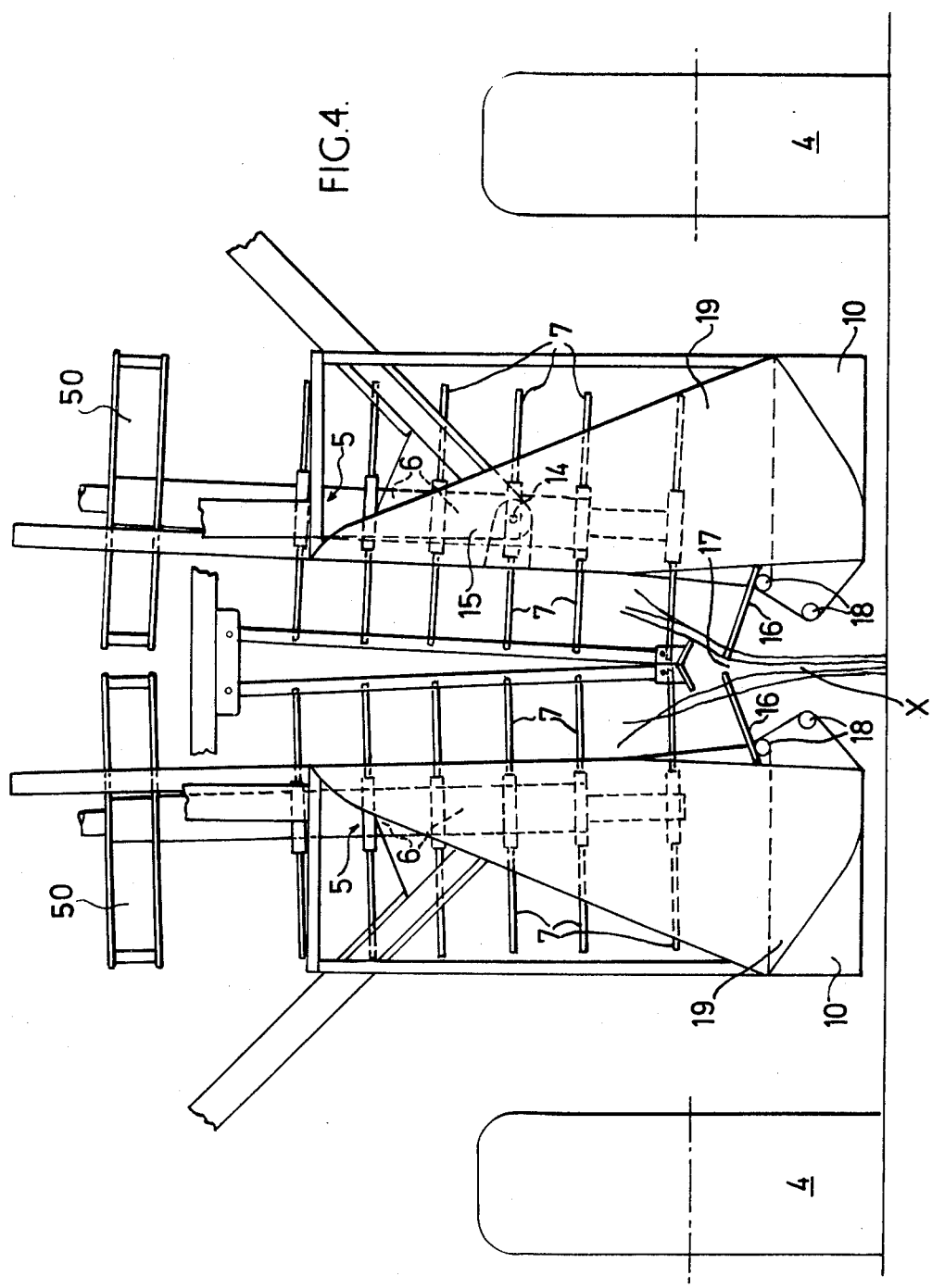

HARVESTERS FOR HARVESTING BERRIES

The invention relates to a harvester for harvesting fruit such as grapes, blackcurrants, raspberries, loganberries, blackberries or other soft fruit from a standing plant without destroying that plant. The harvester is for example of the kind which can straddle a plant during harvesting.

There have been prior proposals for harvesters for harvesting soft fruit from standing plants or bushes. For example the specification of my prior British Pat. No. 1 390 495 of Mar. 1, 1972 discloses such a harvester which has two pairs of shakers for engaging a standing bush. The shakers of each pair are inclined in a "V"-formation of fixed angle. The specification of U.S. Pat. No. 3,325,984 to D. E. Christie et al, patented 20th June 1967, and the specification of U.S. Pat. No. 3,344,591 to D. E. Christie et al, patented Oct. 3, 1967 show a straddle type harvester which has a pair of upright shakers. All these prior harvesters have the drawback that they can only be used to harvest fruit from mature plants.

It is among the objects of the invention to provide a harvester which can harvest fruit from both mature and young plants.

According to a first aspect, the invention provides a harvester for harvesting fruit from a standing plant, comprising a shaker device which is movable between two modes in one of which modes it is inclined more steeply to the vertical than the other.

According to a second aspect the invention provides a straddle harvester for harvesting fruit from a standing plant, comprising one or more rotatable shaker devices the one or each of which is movable between two modes in one of which modes it is inclined more steeply to the vertical than the other.

Thus using the invention there may be provided a harvester in which in one mode of the shaker devices the fruit from a young plant or bush can be harvested from the outside of the bush and in the other mode the fruit from a mature bush can be harvested from the inside of the bush.

There may be four shaker devices arranged in two pairs, each pair being disposed transversely of the fore and aft direction of the frame of the harvester.

In both modes, the shaker devices of a pair assume a "V"-configuration as viewed from the front or rear of the harvester.

The harvester may comprise catch means which is positioned below the shakers for catching harvested fruit and directing it to a handling means for the harvested fruit.

The catch means may comprise two brushes, both of which extend along the frame under the or each shaker device. The brushes may be flat brushes which lie in an inclined plane forming a substantially inverted "V" as considered in end view.

The brushes may terminate at a position spaced from one another so forming a space between which the main stem of the bush passes.

The harvester may comprise a device for guiding the bush so that it is engaged by the or each shaker device. The guiding device may comprise elongate members such as tubes that extend over the length of the frame.

The brushes and the guide means may be combined.

The brushes forming the catch means may direct the harvested fruit to a conveyor means which is adapted to convey the harvested fruit to a storage area of the harvester.

Or the brushes may comprise conveyor means for conveying the harvested fruit from the or each shaker device to the storage area.

The brushes, in the form of conveyor means, may move at substantially the same speed as the harvester moves over the ground for engaging the bush without disturbing it.

Alternatively, there may be a catching/conveying device of the kind shown in my British Pat. application No. 28098/76 of the July 6, 1976.

Constructions of harvester embodying the invention are diagrammatically illustrated, by way of example, in the accompanying drawings, in which:

FIG. 2 is a plan view of the harvester;

FIG. 3 is a front elevational view of the harvester with shaker devices inclined in a mode for harvesting from large or mature bushes;

FIG. 4 is a front elevational view of the harvester (with parts omitted for clarity) with its shaker device in a mode for harvesting from small or young bushes;

Figure 1:
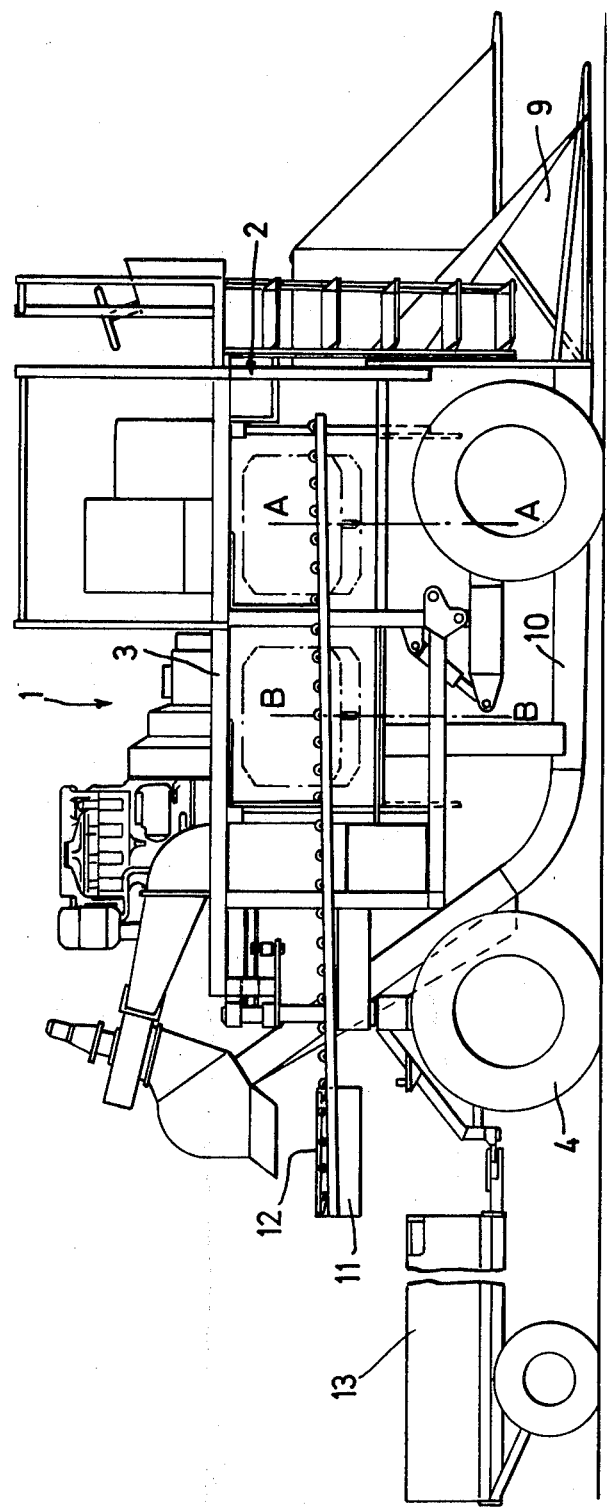
FIG. 1 is a side elevated view of the harvester.

Referring to the drawings, the harvester 1 shown is for harvesting blackcurrants from standing blackcurrant bushes or plants without destroying those bushes.

The harvester has a frame 2 supporting an upper deck 3 which carries a prime mover, hydraulic system, and driver control "cab" including a seat and a steering wheel. The frame 2 is supported on ground engaging wheels 4 and can be adjusted in height above the ground by adjusting means such as hydraulic pistons so that picking of fruit at different heights can be accomplished.

The frame supports four shaker devices 5 arranged in two pairs transversely of the longitudinal centre line of the harvester at position A—A, B—B (FIG. 1). Each shaker device generally comprises a freely rotatable drum which can have imposed on it rotary oscillations about its rotational axis by an inertia mass 50 when that mass is rotated by a hydraulic drive of the harvester. Tines 7 project from the drums 6 and it is these tines that engage and enter a bush and shake it.

Thus, as the harvester moves along a row of bushes, the shaker devices rotate freely. The inertia masses however cause a rapid oscillation to be imposed on the slowly orbiting revolution of the tips of the tines 7 so that a vigorous shaking of a bush ensues when the tines are inside a bush at a rate sufficient to dislodge fruit. The rate may be 100 to 2,500 oscillations per minute, suitably 1000 per minute for blackcurrants.

Figure 2A:
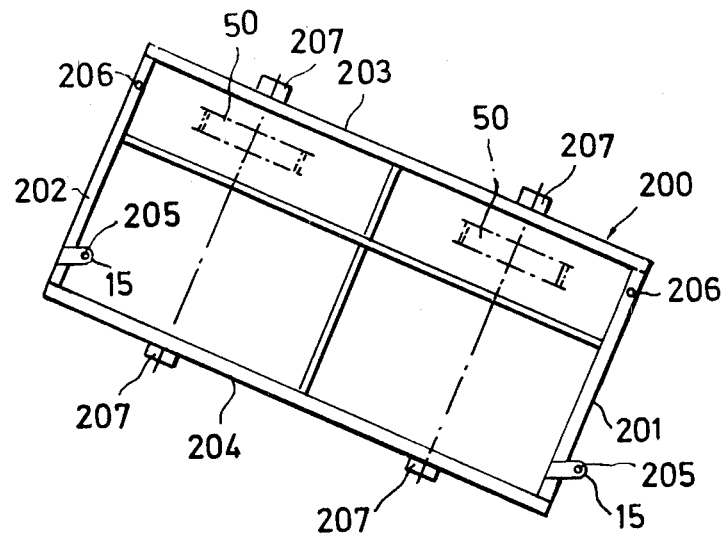
FIG. 2a is a perspective schematic view of a sub-frame of the harvester.
Figure 2B:
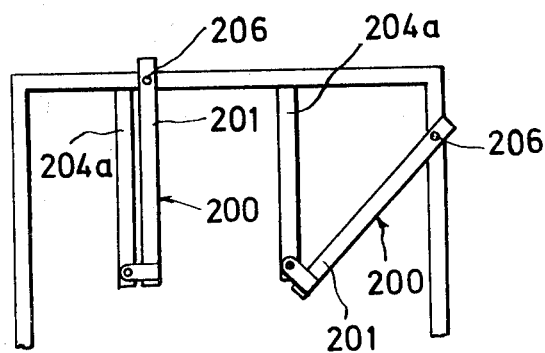
FIG. 2b is an end elevational view of the arrangement of the sub-frame in a main frame of the harvester during movement between the two modes.

The two shaker devices on the left hand side of the machine (as viewed in FIGS. 3 and 4 for example) are mounted on a sub-frame 200 (FIGS. 2a, 2b). Likewise, the two shaker devices on the right hand side of the machine (as viewed in FIGS. 3 and 4 for example) are also mounted on a sub-frame 200. The two sub-frames therefore extend in the fore and aft direction of the harvester. Each sub-frame 200 is of generally rectangular shape formed of, for example, metal box section members 201, 202, 203, 204 secured together as by welding. The fore and aft members 201, 202 each has adjacent one end a bracket 15 with a hole 205 through it and a hole 206 through the opposite end. Each sub-frame 200 supports its two shaker devices in bearings 207 at upper and lower ends of shafts defining the longitudinal axes of the shaker devices and about which they rotate. The sub-frames 200 can be pivoted about a hinge or pivot axis defined by a bolt through the holes 205 and through an adjacent part 204a of the main-frame 2 in the brackets 15 when other bolts through the holes 206 are removed. In this way the whole sub-frame 200 with the shaker devices it supports can be moved to take up either of two inclined modes or positions. When the sub-frame is in the new mode, bolts are passed through the holes 26 and through aligned holes in the main frame and are secured with nuts to hold the sub-frame in the new position. This is diagrammatically shown in FIG. 2b where the right hand side shows the FIG. 3 mode or position and the left hand side shows the FIG. 4 mode or position.

In FIG. 3, one mode is shown and in which the front pair of shaker devices A—A is visible (the rear pair are hidden by the front pair). Both pairs are inclined to provide a relatively wide "V"-configuration in which the apex angle is about 90°. The second mode is known in FIG. 4, in which the shaker devices are substantially upright. By substantially upright it is meant that the longitudinal (rotational) axis of a shaker device subtends an angle of between 0° and 10°, preferably 7° with the vertical.

For use in the one or large bush mode (FIG. 3), there is mounted on the forward end of the harvester a divider 8 which divides the bush into two halves. There is also a pair of curved ploughs 9 which pick up and guide the outer portions of the half bush into guide channels formed by parallel guide tubes (not shown) extending longitudinally of the frame and into which the tines 7 extend so that the tines 7 engage the respective half bush from the inside as the harvester passes over the bush. The guide tubes are about 6" apart and are situated about 1" from a side screen which directs removed crop to collecting means below the shaker devices. The tines 7 shake the half bush vigorously and dislodge the currants which are collected by conveyors 10. The conveyors carry the harvested berries to the rear of the harvester, where they are distributed into collection boxes 11 on a roller conveyor 12. These boxes are stored in a trailer 13 when full.

In order to harvest the currants from young bushes 'X' the shaker devices 5 are adjusted so that they assume the second mode shown in FIG. 4. To effect the adjustment to the mode shown in FIG. 4 bolts through the holes 206 securing the sub-frames to the main frame are released and each sub-frame is pivoted about the hinge axis 14 defined by the bolt through the bracket 15, after the ploughs 9 have been removed and any drive connections for the inertia mass have been disconnected. Once the sub-frame has been moved to the substantially upright position, bolts are inserted through the holes 206 and through the main frame at the position shown to the left of FIG. 2b to and locked with a nut to hold the sub-frame in the new position. Any necessary reconnection of drive to the inertia masses is then made.

Bush handling means in the form of guide tubes 18 are also mounted on the harvester for the young bush mode. Outwardly bowed guide plates 19 which guide the outer parts of the bush X into the harvester are also mounted in the harvester so that the tines 7 enter the bush from the outside, and shake it vigorously to remove the currants.

Catch means in the form of a pair of inclined brushes 16 that form an inverted "V"-configuration and which terminate so as to leave a relatively narrow central gap 17 are mounted on the harvester below the shaker devices.

The brushes (which may be made of nylon of Teflon) direct the harvested currants to the conveyors 10.

The harvester described with reference to the drawings is thus capable of adjustment for harvesting from large or small bushes.

Figure 7:
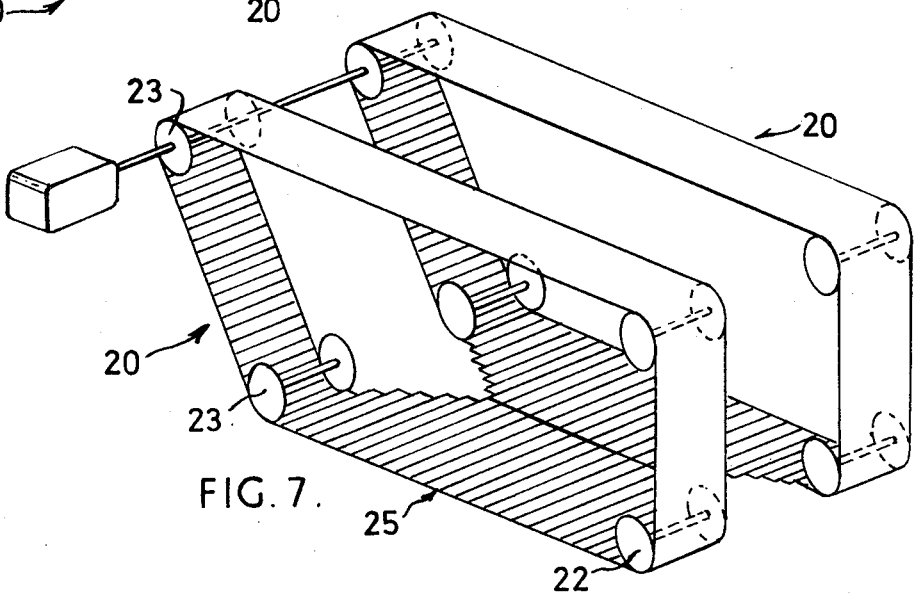
FIG. 7 shows a perspective schematic view of another arrangement of catching/conveying mechanism of my British Patent Application No. 28098/76.

The brushes 16 and conveyors 10 on each side of the longitudinal axis of the harvester may be replaced by a conveyor 20 of the kind described in my British Pat. Application No. 28098/76 and as shown in FIGS. 5 to 10 of the accompanying drawings. There are two conveyors 20 one on either side of the longitudinal axis of the harvester. As both are identical, only one will be described in detail. Each conveyor 20 comprises a pair of endless chains 21 which extend the length of the conveyor in a working/catching run, pass round sprockets 22,23 (the upper one 23 of which is driven) at each end of the harvester and has a return run which is either a lower reach or run (FIG. 5) or an upper reach or run (FIG. 7).

In each case, the conveyor working run moves in a direction opposite to the direction of movement of the harvester over the ground. The driven sprockets 23 are driven by a hydraulic motor 23a operated by the prime mover and the speed of which in use is virtually instantaneously controlled by any speed sensing control unit to be opposite to the ground speed of the conveyor 20 so that the effective ground speed of the conveyor is zero. A speed sensing control unit of the kind is described in my British Patent Application No. 36436/76.

The chains 21 support a plurality of guides in the form of transverse rods 24. The rods 24 are of metal covered with a lubricating surface such as a nylon coating and are arranged in pairs. Each pair of rods 24 supports an elongate member comprising a trough or tray 25 and a cam follower 26.

Successive trays 25 overlap in the direction of the working run (by ¼" in the embodiment shown) to provide a substantially continuous conveying and catching surface.

The cam follower 26 and the trays 25 are reciprocable on the rods 24 in a direction transversely to the conveying direction of the conveyor. Each tray 25 is, in the embodiment illustrated, secured as by bolts 27 to a carrier 28 which includes two tubes 29 through which the rods 24 pass. The cam follower 26 is likewise supported as by a bolt 30 on a carrier 31 in the form of two tubes 32. The bolt 30 also forms an anchorage for one end of a tension spring 33, the opposite end of which is secured in the carrier 28 for the tray, as by having its hooked end engaged through holes in that carrier.

Figure 8:
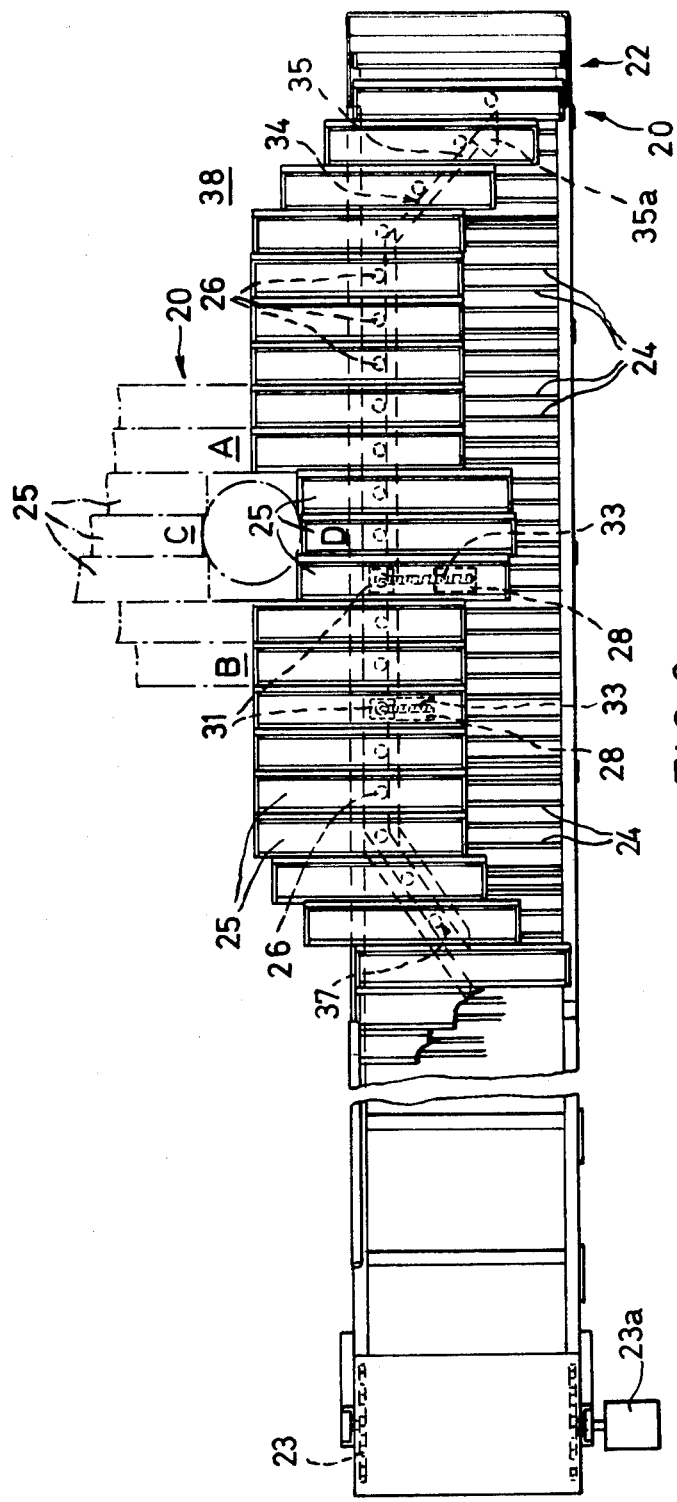
FIG. 8 shows a plan view, partly cut away, of the mechanism of FIG. 5.
Figure 9:
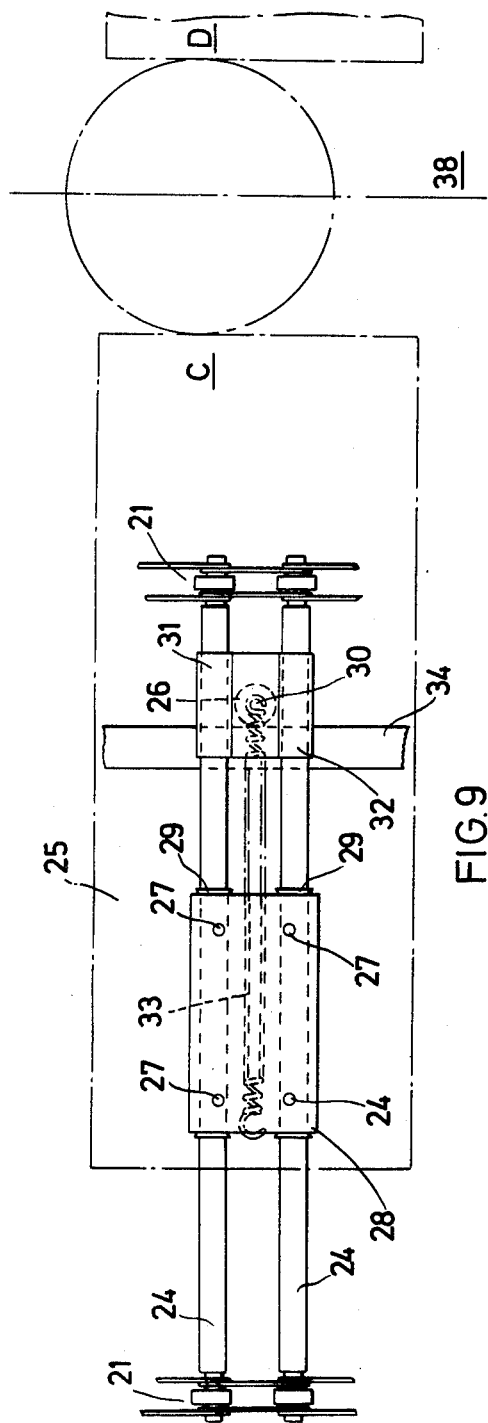
FIG. 9 shows a plan view, partly cut away and partly in phantom of a single element of the mechanism of FIG. 8.
Figure 10:
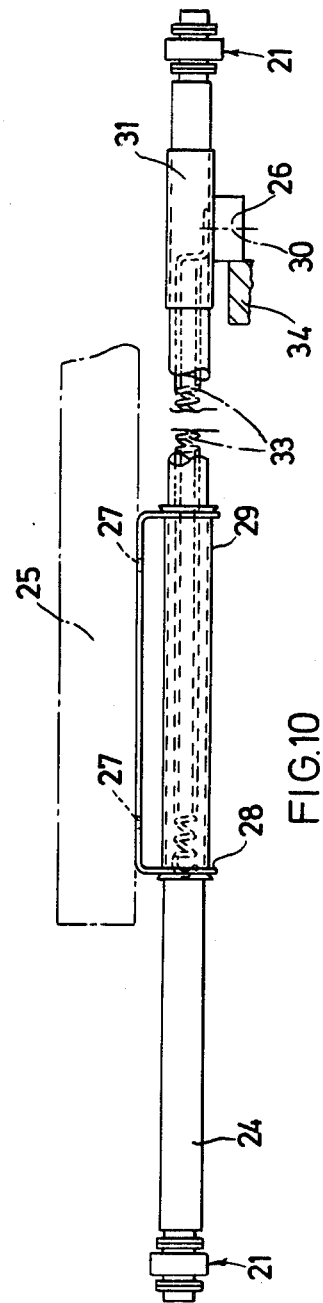
FIG. 10 shows an end elevational view partly cut away and partly in phantom of the element of FIG. 9.

The harvester also has two cams 34, one for each conveyor and one of which is shown in FIG. 8. Each cam 34 has an inclined lead-in portion 35 at the front end of the harvester, a straight portion 36 and an inclined lead-out portion 37 at the trailing end of the harvester.

The lead in portion 35 of each cam 34 has an angle of 45° and the lead-out portion 37 has an angle of 37½°. The shallower angle of the lead-out portion 37 provides a relatively slow withdrawal motion of the (full) trays so that harvested fruit in the trays is not lost by a too rapid change of direction which could lead to jolting, with subsequent loss of fruit.

Figure 5:
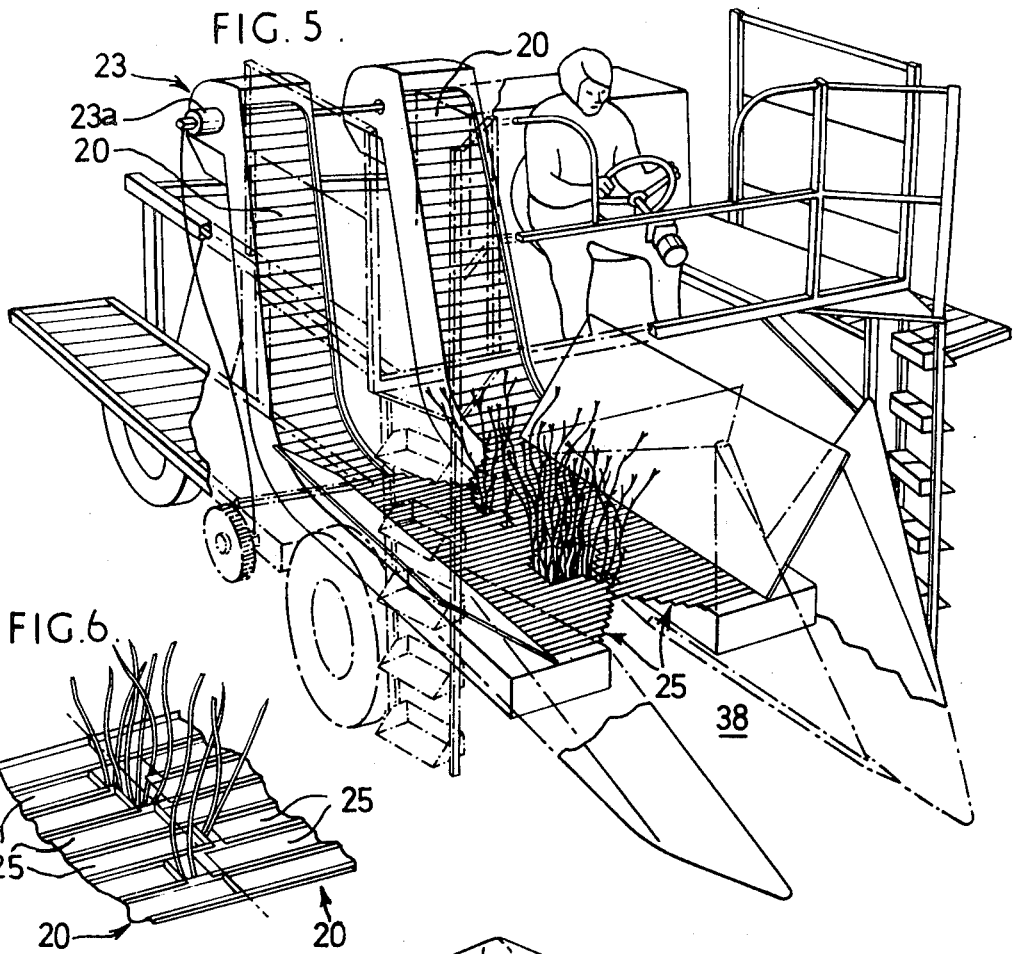
FIG. 5 shows a schematic perspective view of a harvester frame with a catching/conveying mechanism of the kind shown in my British Pat. Application No. 28098/76.
Figure 6:
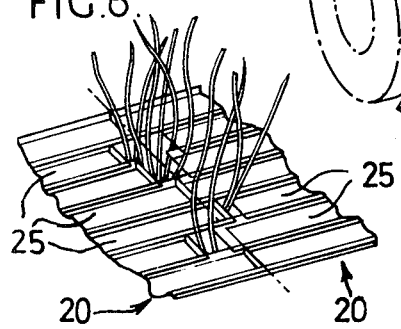
FIG. 6 shows a detail of the catching/conveying mechanism of FIG. 5.

Use of the conveyor 20 will be described with reference to the conveyor having a lower return run shown in FIG. 5 though it will be understood that the upper return run conveyor operates in a similar way.

Using the conveyors for harvesting grapes or blackcurrants for example, the harvester is driven along a row of plants so that it straddles the row. The conveyors 20 move in the opposite direction relative to the harvester. As a result the effective speed at a plant is zero so that the harvested fruit drop into a seemingly stationary series of trays 25 which are the conveyor elements. This is accomplished by synchronising the speed of the conveyor relative to the speed of the harvester, preferably by a means whereby slippage of the drive system of the conveyor or of the ground wheels does not affect the synchronisation, as shown in my British Patent Application No. 36436/76. During transition from the upwardly inclined run to the lower run, the fruit is transferred to collecting tubs or other suitable collectors.

In order to close the centre space 38 of the harvester (normally about 18" in conventional straddle harvesters) the trays 25 are urged to the centre line of the harvester by their springs 33 as they start their upper conveying run. This is gradually accomplished as their cam followers 26, which may be in the form of bosses, lugs or rollers suitably of nylon, travel along the inclined forward part 35 of the cam 34 which is angled to an optimum angle, which may be adjusted. The cam followers 26 are moved out to their maximum as they move along the straight part 36. The spring 33 urges the tray carrier 28 into engagement with the carrier 31 for the cam follower 26, which carrier 31 thus acts as a stop for the trays with the spring 33 under only a slight tension, which assists in decreasing risk of failure of the spring. The tubes 29 of the tray carrier have flared mouths into which the carrier tubes enter.

The right hand and left hand conveyor trays are arranged so that they meet at the centre line of the harvester as shown at 'A' and 'B'. The harvested berries can run down inclined side screens of the harvester into the trays, any gap being closed by a sealing device in the form of a nylon brush which extends the harvesting length of the harvester.

When the harvester approaches a plant or another obstruction such as a concrete post, the trays move only as far as that obstruction, as shown at 'C' and 'D' because in effect the conveyors are stationary with respect to the obstruction. The trays are held tightly against the obstruction by the springs so that any gap is minimised. The springs are under a greater tension in these positions than when they are in the 'A' or 'B' position. The trays move out to their 'A', 'B' positions when the harvester moves on leaving the obstruction behind. The trays are retracted from the return run when the cam followers 26 engage the part 37 of the cam 34.

A part 35a of the cam 34 (at the fore end of the harvester) is removable. When it is removed, the cam followers do not strike the cam part 35 and thus are not moved outwardly to the centre line. This may be necessary in certain circumstances.

The trays 25 may be made of any suitable material, for example steel, or plastics, or aluminium.

In either mode of the shaker devices, the harvester is driven so that it moves along a row, straddling the plants in that row and shaking those plants vigorously, when the tines enter therein, to remove the fruit.

Of course, the harvester shown can be modified in various ways. For example, the brushes of FIGS. 1 to 4 themselves may be in the form of conveyors which convey the berries to the collecting area. Further, the brushes may meet so there is no gap. The brushes would then be bent aside by the stem of a bush as the harvester moved along a row of bushes. Also, the brushes and the guide tubes may be combined into a single unit for ease of mounting and dismounting. Also, although a straddle harvester has been described, the harvester could be one which picks laterally. In any embodiment, the shaker devices may be resiliently mounted so that they move aside if they strike an obstacle and are urged back to their initial position once the obstacle is passed, during harvesting of grapes for example.

It will be understood that conventional details of the harvester such as air devices (either suction or blowing) which are used to separate leaves, twigs, etc. from the harvested berries are not shown in detail, nor is the hydraulic system used for driving the shaker devices.

We claim:

1. A harvester for bush grown crops such as currants adapted to operate in either of two entirely different discrete operating modes, a "mature bush" mode wherein each bush is split into halves and the two halves are spread apart and then shaken by applying shaking means to the inner side of each half, and a "young bush" mode wherein the bushes are shaken by applying shaking means to opposite outer sides of the bushes, said harvester comprising a carriage having a main frame, drive wheels, and a power means for driving the wheels such that the harvester is adapted to move longitudinally along a row of bushes in a bush straddling position, two laterally disposed sub-frames also straddling the bushes, two laterally disposed cylindrical shaker devices mounted for free rotation about their own axes on said respective sub-frames, said shaker devices having radially extending tines to engage the bushes, whereby, because of the relative movement between the bushes and shaker devices, said shaker devices are caused to rotate at a rate proportional to the velocity of said harvester, said shaker devices also including oscillatory means for superimposing an oscillatory increment upon the rotation of said shaker devices to thereby cause said tines to shake the bushes, bush divider means removably mounted on said main frame, and projecting downwardly and forwardly therefrom centrally and longitudinally of the harvester, for dividing the bushes into two halves and spreading the halves for operation in the "mature bush" mode, said removable mounting being applicable for detaching said divider means from said harvester for operation in the "young bush" mode, means for pivotally mounting a lower portion of each of said sub-frames on said main frame for angular movement about a longitudinally extending horizontal axis, means for selectively securing said sub-frames to said main frame in a selected one of two discrete relative angular positions associated respectively with said two discrete operating modes, in both of which positions the axes of said shaker devices diverge upwardly and outwardly from one another in a generally V shaped arrangement, in that one of which positions which is associated with the "mature bush" mode the axes of said shaker devices subtend a substantial angle with the vertical so that the laterally outer portions of the shaker devices are adapted to engage the inside portions of the spread mature bush halves, and in that one of which positions which is associated with the "young bush" mode the axes of said shaker devices are substantially vertical so that the laterally inner portions of the shaker devices are adapted to engage the laterally outer portions of the young bushes, laterally opposed crop catcher means disposed below said shaker devices, and conveyor means associated with said catcher means for transporting the crop to the rear of the harvester.

2. The harvester of claim 1 further including divergent plow means removably mounted on said main frame for picking up and guiding the laterally outer portions of the divided bush halves.

3. The harvester of claim 1 wherein, in that one of the shaker positions which is associated with the "young bush" mode, the axes of said shaker devices subtend an angle between 0° and 10° with the vertical.

4. The harvester of claim 3 wherein, in that one of the shaker positions which is associated with the "young bush" mode, the axes of said shaker devices subtend an angle of about 7° with the vertical, and wherein, in that one of the shaker positions which is associated with the "mature bush" mode, the axes of said shaker devices subtend an angle of about 45° with the vertical.

5. The harvester of claim 1 wherein, in that one of the shaker positions associated with the "mature bush" mode, the axes of said shaker devices subtend an angle of about 45° with the vertical.

* * * * *